US012747342B2

(12) United States Patent
Grace et al.

(10) Patent No.: US 12,747,342 B2
(45) Date of Patent: Sep. 29, 2026

(54) NITRILE BUTADIENE RUBBER (NBR)-POLYESTER HYBRID CONDUCTIVE COATING

(71) Applicant: Wolverine Advanced Materials, LLC, Dearborn, MI (US)

(72) Inventors: Bryan Grace, Dearborn, MI (US); Abed Hashemi, Dearborn, MI (US); Drew Zawacki, Dearborn, MI (US)

(73) Assignee: Wolverine Advanced Materials, LLC

(*) Notice: Subject to any disclaimer, the term of this patent is extended or adjusted under 35 U.S.C. 154(b) by 921 days.

(21) Appl. No.: 17/972,970

(22) Filed: Oct. 25, 2022

(65) Prior Publication Data

US 2024/0158618 A1 May 16, 2024

(51) Int. Cl.

| | |
|---|---|
| ***C08L 9/02*** | (2006.01) |
| ***C08K 3/04*** | (2006.01) |
| ***C08K 3/08*** | (2006.01) |
| ***C08L 67/00*** | (2006.01) |
| ***C09D 5/24*** | (2006.01) |
| ***C09D 109/02*** | (2006.01) |
| ***H01B 1/24*** | (2006.01) |

(52) U.S. Cl.

CPC .................. *C08L 9/02* (2013.01); *C08K 3/04* (2013.01); *C08K 3/08* (2013.01); *C08L 67/00* (2013.01); *C09D 5/24* (2013.01); *C09D 109/02* (2013.01); *H01B 1/24* (2013.01)

(58) Field of Classification Search

CPC ........ C08L 67/00–08; C08L 9/02; C08L 9/04; C09D 167/00–08; C09D 109/02; C09D 109/04; C09D 5/24; C09J 167/00–08; C09J 109/02; C09J 109/04; C08J 2367/00–08; C08J 2309/02; C08J 2309/04; C08J 2409/02; C08J 2409/04; C08J 2467/00–08; H01B 1/20–24; C08K 3/04; C08K 3/08

See application file for complete search history.

(56) References Cited

U.S. PATENT DOCUMENTS 2,625,526 A * 1/1953 Sparks ...................... C08L 9/02
525/169
4,141,863 A * 2/1979 Coran ...................... C08K 3/22
525/146

(Continued)

FOREIGN PATENT DOCUMENTS

CN 106905889 A * 6/2017 .............. C09J 11/06

OTHER PUBLICATIONS

Partial machine translation of CN-106905889-A (Year: 2017).*

(Continued)

*Primary Examiner* — Kregg T Brooks

(74) *Attorney, Agent, or Firm* — Honigman LLP

(57) ABSTRACT

A conductive rubber composite coating can be provided from both an aqueous or non-aqueous formulation which includes a mixture, preferably a homogenous mixture, of a nitrile butadiene rubber (NBR), a polyester and at least one conductive filler. In some embodiments, and after coating and vulcanization the formulation to a substrate, a conductive rubber coated article of manufacture (e.g., rubber coated material gasket) is provided that has conductivity and electromagnetic interference shielding suitable for use in EV applications.

17 Claims, 2 Drawing Sheets

(56) References Cited

U.S. PATENT DOCUMENTS

| | | | | |
|---|---|---|---|---|
| 4,614,682 | A * | 9/1986 | Suzuki | B41M 5/385<br>106/31.62 |
| 4,642,202 | A | 2/1987 | Railsback | |
| 5,787,822 | A * | 8/1998 | Hilliard | C10J 3/42<br>110/235 |
| 6,338,898 | B1 | 1/2002 | Miyahara et al. | |
| 6,458,883 | B1 | 10/2002 | Takashima et al. | |
| 7,520,057 | B2 | 4/2009 | Imasaka et al. | |
| 7,727,135 | B2 | 6/2010 | Urano et al. | |
| 7,976,927 | B2 | 7/2011 | Tanaka et al. | |
| 2004/0028859 | A1 * | 2/2004 | LeGrande | H01B 1/22<br>428/323 |
| 2017/0342241 | A1 * | 11/2017 | Fukumine | C08K 5/17 |
| 2018/0163063 | A1 * | 6/2018 | Gao | C09D 7/69 |

OTHER PUBLICATIONS

Evaporated Coatings Inc, "Transparent Conductive Coatings", printed on Oct. 25, 2022, 5 pages, https://evaporatedcoatings.com/optical-coatings/transparent-coatings/.

ShinEtsu, "Electrically conductive rubber products", printed on Oct. 25, 2022, 3 pages https://www.shinetsusilicone-global.com/products/type/cond_ec/index.shtml.

* cited by examiner

NITRILE BUTADIENE RUBBER (NBR)-POLYESTER HYBRID CONDUCTIVE COATING

FIELD OF THE DISCLOSURE

The present disclosure relates to a conductive polymeric coating for sealing applications and other automotive applications, and more particularly to an aqueous or non-aqueous formulation for forming a conductive rubber composite film. The technology encompasses the formation of the conductive rubber composite film made from the formulation, the article of manufacture including the conductive rubber composite film as a coating, and a method of forming the conductive rubber composite film.

BACKGROUND

In recent years, there has been an increased interest for rubber coated material (RCM) gaskets for electric vehicle (EV) applications, electromagnetic interference (EMI) shielding, fuel cells, and circuit boards. For EVs, the RCM can be used for different sections such as, for example, electronic components (e.g., stator housing cover, battery housing, and final drive mating faces), electronics (e.g., enclosure interface) and battery components (e.g., service panel, breather and burst valve). A conductive RCM is a suitable candidate for EV applications in which the RCM can provide both sealing applications and electromagnetic interference (EMI) shielding.

SUMMARY

A conductive rubber composite coating can be provided from both an aqueous or non-aqueous formulation which comprises a mixture, preferably a homogenous mixture, of a nitrile butadiene rubber (NBR), a polyester and at least one conductive filler. In some embodiments, the formulation can further comprise a hydrogenated nitrile butadiene rubber (HNBR), a carboxylated nitrile butadiene rubber (XNBR), and at least one additive. In some embodiments, after coating the formulation onto a substrate, and vulcanization of the coated substrate, a conductive rubber coated article of manufacture (e.g., rubber coated material gasket) is provided that has conductivity and electromagnetic interference shielding suitable for use in EV applications.

In one aspect of the present disclosure, a formulation for forming a conductive rubber composite coating is provided. In one embodiment, the formulation comprises a mixture, preferably a homogeneous mixture, of from about 20 weight percent to about 90 weight percent of nitrile butadiene rubber (NBR), from about 5 weight percent to about 50 weight percent of a polyester, and from about 5 weight percent to about 40 weight percent of at least one conductive filler.

In some embodiments, the mixture, preferably a homogenous mixture, can further comprise a hydrogenated nitrile butadiene rubber (HNBR), a carboxylated nitrile butadiene rubber (XNBR), a polymer other than the polyester (e.g., a natural rubber (NR), ethylene propylene diene monomer rubber (EPDM), polyacrylic elastomers (ACM) and/or polyvinyl chloride (PVC)), at least one additive (e.g., a wetting agent, a dispersing agent, a rheology modifier, a wax, a defoaming agent, a pH control agent, an adhesion promoter, a plasticizer, an antioxidant, an antiozonant, a tackifier, a flame retardant, a curative agent, a fungicide, and/or a blowing agent) or any combination thereof (e.g., HNBR and at least one additive). In some embodiments, the mixture, preferably the homogenous mixture, is aqueous, while in other embodiments the mixture, preferably homogenous, is non-aqueous.

In another aspect of the present disclosure, a conductive rubber composite coating is provided; the conductive rubber composite coating is a vulcanized product of the formulation of the present disclosure. In one embodiment, the conductive rubber composite coating comprises an elastomeric polymer blend of a nitrile butadiene rubber and a polyester. The elastomeric polymer blend has at least one conductive filler contained therein and a conductivity of about $10E^{-4}$ Siemens per centimeter (S/cm) or greater. In some embodiments, the elastomeric polymer blend has an electromagnetic interference shielding of about 40 decibels (dB) or greater. In embodiments of the present disclosure, the coating is a foamed coating or a non-foamed coating.

In another aspect of the present disclosure, an article of manufacture such as, for example, a rubber coated gasketed material for EV applications, is provided. The article of manufacture includes the conductive rubber composite coating described above. Notably, and in one embodiment, the article of manufacture comprises a substrate, and an elastomeric polymer blend of a nitrile butadiene rubber and a polyester as a coating located on a surface (i.e., at least one, preferably more than one) of the substrate. The elastomeric polymer blend has at least one conductive filler contained therein, and a conductivity of about $10E^{-4}$ S/cm or greater. In some embodiments, the elastomeric polymer blend has an electromagnetic interference shielding of about 40 dB or greater.

DETAILED DESCRIPTION

Figure 1:
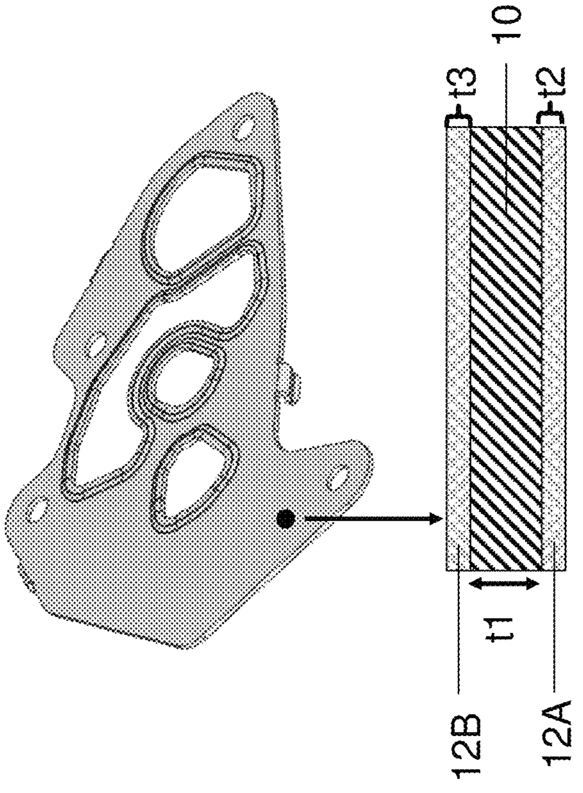
FIG. 1 is cross sectional view of an article of manufacture including an elastomeric polymer in accordance with the present disclosure located on a topmost surface and a bottommost surface of a substrate.

The present disclosure will now be described in greater detail by referring to the following discussion and drawings that accompany the present disclosure. In the following description, numerous specific details are set forth, such as particular structures, components, materials, dimensions, processing steps and techniques, to provide an understanding of the various embodiments of the present disclosure. However, it will be appreciated by one of ordinary skill in the art that the various embodiments of the present disclosure may be practiced without these specific details. As used throughout the present disclosure, the term "about" generally indicates no more than ±10%, ±5%, ±2%, ±1% or ±0.5% from a number. When a range is expressed in the present disclosure as being from one number to another number (e.g., 20 to 40), the present disclose contemplates any numerical value that is within the range (i.e., 22, 24, 26, 28.5, 31, 33.5, 35, 37.7, 39 or 40) or any in amount that is bounded by any of the two values that can be present within the range (e.g., 28.5-35).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprise[s]" and/or "comprising" and/or "include[s]" or "including", when used in this disclosure, specify the presence of stated features, integers, steps, operations, elements, and/or components, but do not preclude the presence or addition of one or more other features, integers, steps, operations, elements, components, and/or groups thereof.

As stated above, a conductive rubber composite coating is provided from an aqueous or non-aqueous formulation that includes a mixture, preferably a homogeneous mixture, of a nitrile butadiene rubber, a polyester and at least one conductive filler. After coating and vulcanization of the formulation on a substrate i.e., metals (such as, for example, cold rolled steel, stainless steel, galvanized steel, and/or aluminum), plastics (such as, for example, high density polyethylene (HDPE), low density polyethylene (LDPE), or polytetrafluorethylene (PTFE), etc.), textiles and fabrics (such as, for example, fiberglass, polyester, or nylon), a conductive rubber coated article of manufacture (e.g., a rubber coated material gasket) is provided that has a conductivity and/or electromagnetic interference shielding suitable for use in EV applications. These and other aspects of the present disclosure will now be described in greater detail.

Throughout the present disclosure, the term "homogeneous mixture" denotes a mixture in which the components/raw materials produce a uniformly distributed liquid coating. On one hand, the homogeneity of the liquid coating is crucial for processing thin and thick conductive film castings by roll or blade coating. On the other hand, the designed polymer blends have to show partial immiscibility between the polymeric components due to selective polarity differences once coated, dried and vulcanized. This allows for optimized filler localization at the polymer-polymer and polymer-filler interfaces increasing the overall conductivity.

Throughout the present disclosure, the term "conductive rubber composite coating" denotes a rubberized material (i.e., elastomeric polymer blend) with conductive properties that can reduce or even eliminate electromagnetic interference. The conductive properties of the conductive rubber composite coating are afforded by at least one conductive filler that is dispersed within the elastomeric polymer blend.

Throughout the present disclosure, the term "elastomeric polymer blend" denotes a polymer with viscoelasticity (i.e., having both viscous and elastic characteristics). The elastomeric polymer blend of the present disclosure includes a nitrile butadiene rubber and a polyester, which has at least one conductive filler contained in the polymer, preferably in the matrix of the polymer.

The formulation of the present disclosure is a mixture, preferably a homogeneous mixture, of from about 20 weight percent to about 90 weight percent of a nitrile butadiene rubber (NBR), from about 5 weight percent to about 50 weight percent of a polyester, and from about 5 weight percent to about 40 weight percent of at least one conductive filler. More typically, the mixture, preferably the homogeneous mixture, includes from about 20 weight percent to about 70 weight percent of the nitrile butadiene rubber, from about 5 weight percent to about 20 weight percent of the polyester, and from about 10 weight percent to about 30 weight percent of the at least one conductive filler. Even more typically, the mixture, preferably the homogeneous mixture, includes from about 50 weight percent to about 70 weight percent of the nitrile butadiene rubber, from about 10 weight percent to about 20 weight percent of the polyester, and from about 15 weight percent to about 30 weight percent of the at least one conductive filler.

The NBR that can be employed in the present disclosure is a synthetic rubber derived from acrylonitrile (ACN) and butadiene. NBR is resistant to oil, fuel and other chemicals. The NBR that can be employed according to an embodiment of the present disclosure has the formula $-(CH_2-CH{=}CH-CH_2)_x-(CH_2-CH(CN))_y$, wherein x is from 3500 to 5200, more typically from 3500 to 4500, and even more typically, from 3500 to 4200, and y is from 2500 to 3500, more typically from 2500 to 3350, and even more typically, from 2500 to 3250.

The NBR that can be employed according to an embodiment of the present disclosure can have an acrylonitrile, i.e., $CH_2-CH(CN)$, content of from about 15 percent to about 50 percent, and a butadiene content of from about 50 percent to about 85 percent. More typically, the acrylonitrile content of the NBR that can be employed in the present disclosure is from about 30 percent to about 40 percent, and the butadiene content of the NBR is from about 60 percent to about 70 percent. Even more typically, the acrylonitrile content of the NBR that can be employed in the present disclosure is from about 35 percent to about 40 percent, and the butadiene content of the NBR is from about 60 percent to about 65 percent.

The NBR that can be employed according to an embodiment of the present disclosure can be made utilizing techniques that are well known to those skilled in the art. For example, the NBR can be formed utilizing an emulsion polymerization process. In a typical emulsion polymerization process: water, emulsifier/soap, monomers (i.e., butadiene and acrylonitrile), a radical generating activator, and other ingredients are introduced into a polymerization vessel. The emulsion process yields a polymer latex that is coagulated using various materials (e.g., calcium chloride, aluminum sulfate) to form crumb rubber that can be subsequently dried and compressed into bales. NBR is commercially available in both solid and latex form and can be sold under various tradenames such as, for example, PERBUNAN®, NIPOL®, KRYNAC® and Europrene®.

The polyester that can be employed according to one or more embodiments of the present disclosure includes a polymer and/or copolymer that contains an ester functional group in every repeating unit of the polymer's main chain. The polyester serves a variety of functions, such as adjusting polarity and miscibility level of the polymer blend to tune the mutual polymer-polymer and polymer-filler interaction, as well as tune the crosslink density as a co-cure polymer where a variety of functional groups such as; thiols, amines, epoxy, carboxylate, ether, diene, etc., can be used. In addition, polyesters can be used to adjust hardness of the final coating. Notably, the polyester that can be employed in the present disclosure includes at least one ester chain having a formula of $-[O-C(O)-R]_n-$ wherein R is an aromatic, saturated or unsaturated aliphatic group. Aromatic functional groups include at least one aromatic ring. Examples of aromatic functional groups that can be present in the polyester include, but are not limited to, benzene, naphthalene, furan, pyridine, indole, etc. The aliphatic functional group is a hydrocarbon containing carbon and hydrogen joined together in straight chains, branched trains or non-aromatic rings. Saturated aliphatic groups contain carbon-carbon single bonds, while unsaturated aliphatic groups contain a carbon-carbon double or a carbon-carbon triple bond. Exemplary saturated aliphatic groups that can be employed include, but are not limited to, methane, propane, cyclohexane, propanol, etc. Examples of unsaturated aliphatic groups that can be employed include, but are not limited to, propene, cyclohexene, pentene, hexene, etc. The aliphatic group could be branched, linear or grafted with functional groups. In the above formula, n is from 10 to 1000. More typically, at least one ester chain of the polyester that can be employed in the present disclosure includes an aromatic, saturated or unsaturated aliphatic group; the aliphatic group could be branched, linear or grafted with functional groups as the R group and n is from 10 to 500. Even more typically, at least one ester chain of the polyester that can be employed in the present disclosure includes an aromatic, saturated or unsaturated aliphatic group; the aliphatic group could be branched, linear or grafted with functional groups as the R group and n is from 10 to 100. The polyesters that can be employed in the present disclosure can have a molecular weight of from about 1000 to about 5000, with a molecular weight from about 1500 to about 3000 being more typical. Polyesters can be formed utilizing processes well known to those skilled in the art. Polyesters can be formed by a polycondensation reaction, a ring-opening polymerization, and a polyaddition reaction.

Examples of polyester that can be employed in the present disclosure are as follows:

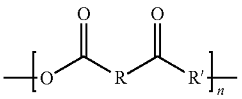

Polyester

R, R′

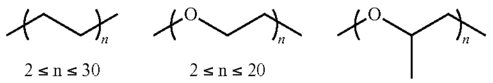

2 ≤ n ≤ 30    2 ≤ n ≤ 20    2 ≤ n ≤ 20

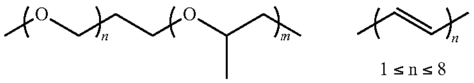

2 ≤ n ≤ 20
2 ≤ m ≤ 20    1 ≤ n ≤ 8

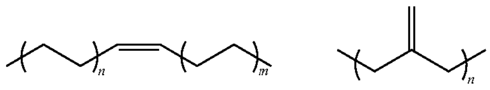

2 ≤ n + m ≤ 20    1 ≤ n ≤ 4

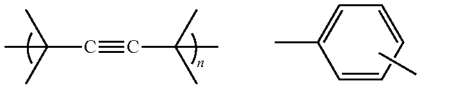

1 ≤ n ≤ 4

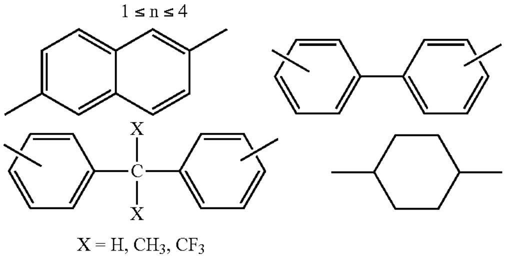

X = H, $CH_3$, $CF_3$

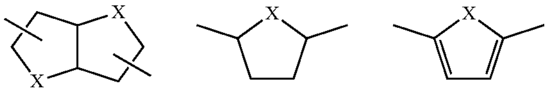

X = C, O, N, S, Se

Grafted/functional groups

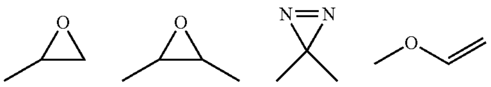

-continued

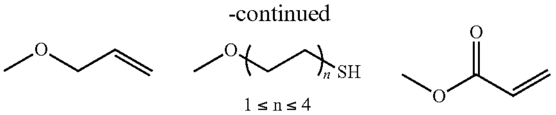

1 ≤ n ≤ 4

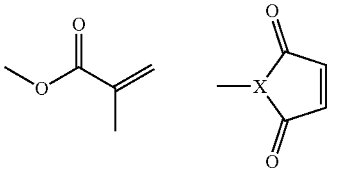

X = O, N, S

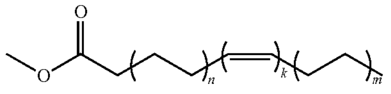

2 ≤ n + m ≤ 20
1 ≤ k ≤ 3

At least one conductive filler that can be employed in the formulation of the present disclosure includes carbon black, graphene, carbon nanotubes, a conductive metal nanoparticle or any combination thereof, for example, a combination of carbon black and a conductive metal nanoparticle. In some embodiments, the at least one conductive filler that can be employed in the formulation of the present disclosure includes a conductive filler combination of carbon black, graphene, carbon nanotubes, and a conductive metal nanoparticle. In such an embodiment, the weight percent of total conductive filler in the formulation includes from about 5 weight percent to about 90 weight percent of carbon black, from about 10 weight percent to about 50 weight percent of graphene, from about 5 weight percent to about 20 weight percent of a carbon nanotube, and from about 5 weight percent to about 20 weight percent of a conductive metal nanoparticle. More typically, the conductive filler combination includes from about 20 weight percent to about 50 weight percent of carbon black, from about 10 weight percent to about 40 weight percent of graphene, from about 10 weight percent to about 20 weight percent of a carbon nanotube, and from about 10 weight percent to about 20 weight percent of a conductive metal nanoparticle.

The carbon black that can be employed in the present disclosure typically has a purity content from about 90 percent to about 99.9 percent, with a purity content from about 95 percent to about 99 weight being more preferred. The carbon black that can be employed in the present disclosure can have a particle size of about 8 nm to about 100 nm, with a particle size from about 5 nm to about 30 nm being more typical.

The graphene that can be employed in the present disclosure can have a particle size of about 2 μm to about 20 μm, with a particle size from about 5 μm to about 10 μm being more typical. Graphene can be employed in a solvent based, water based, or in a dry powder form.

The carbon nanotubes (CNTs) that can be employed in the present disclosure can have a particle size of about 10 nm to about 100 nm, with a particle size from about 5 nm to about 20 nm being more typical. Carbon nanotubes can be employed in a solvent based, water based, or in a dry powder form.

The conductive metal nanoparticles that can be employed in the formulation of the present disclosure include any transition metal oxide which has conductive properties. Examples of transition metal oxides that can be used as conductive metal nanoparticles include, but are not limited to, oxides of Ti, V, Cr, Mn, Fe, Co, Ni, Cu, Zr, Nb, Mo, Ru, Rh, Pd, Ag, Hf, Ta, W, Re, Ir, Pt or Au. Any combination of transition metal oxides can be used as the conductive metal nanoparticles. For example, the conductive metal nanoparticles can include Co-containing nanoparticles and Cu-containing nanoparticles. The conductive metal nanoparticles employed in the present disclosure are typically spherical or substantially spherical; there may be some irregularity within the shape that deviates from being completely spherical. The conductive metal nanoparticles employed in the present disclosure can have a particle size of about 1 nm to about 100 nm, with a particle size from about 10 nm to about 50 nm being more typical.

In some embodiments of the present disclosure, the formulation can further include, in addition to NBR, polyester and at least one conductive filler, a hydrogenated nitrile butadiene rubber (HNBR) and/or a carboxylated nitrile butadiene rubber (XNBR).

When an HNBR is employed, the HNBR can be present in an amount from about 30 weight percent to about 70 weight percent, with an amount from about 50 weight percent to about 70 weight percent being more typical. In embodiments in which an HNBR is employed, the HNBR contains up to 20 percent residual double bonds. More typically, the HNBR that can be employed in some embodiments of the present disclosure can contain from 5 to 15 percent residual double bonds. Even more typically, the HNBR that can be employed in some embodiments of the present disclosure can contain from 6 to 10 percent residual double bonds. The HNBR that can be employed in the present disclosure can have an acrylonitrile, i.e., $CH_2$—CH (CN), content of from about 16 percent to about 50 percent, and a butadiene content of from about 50 percent to about 84 percent. More typically, the acrylonitrile content of the HNBR that can be employed in the present disclosure is from about 20 percent to about 40 percent, and the butadiene content of the HNBR is from about 60 percent to about 80 percent. Even more typically, the acrylonitrile content of the HNBR that can be employed in the present disclosure is from about 25 percent to about 35 percent, and the butadiene content of the HNBR is from about 65 percent to about 75 percent. HNBR can be produced through the selective hydrogenation of NBR. The reactive double bonds are removed from NBR. As a result, the molecule chain does not react as easily to oxygen and is thus significantly more heat resistant than NBR.

When a XNBR is employed, the XNBR can be present in an amount from about 30 weight percent to about 70 weight percent, with an amount from about 50 weight percent to about 70 weight percent being more typical. In one embodiment, and when a combination of HNBR and XNBR is employed, the HNBR can be present in an amount from about 30 weight percent to about 70 weight percent, and the XNBR can be present in an amount from about 0 weight percent to about 30 weight percent. In another embodiment, and when a combination of HNBR and XNBR is employed, the HNBR can be present in an amount from about 50 weight percent to about 70 weight percent, and the XNBR can be present in an amount from about 30 weight percent to about 50 weight percent. XNBR is a type of NBR containing a carboxyl functional group which causes the resultant coating of the present disclosure to exhibit enhanced tear and abrasion resistance. XNBR is a terpolymer of butadiene, acrylonitrile, and acrylic acid. The presence of the acrylic acid introduces carboxylic acid groups ($RCO_2H$) to the terpolymer. Typically, the XNBR employed in the present disclosure has a carboxylic acid content of from about 0.03 ephr to about 0.07 ephr, a butadiene content of from about 50 percent to about 85 percent, and an acrylonitrile content of from about 15 percent to about 50 percent. More preferably, the XNBR employed in the present disclosure has a carboxylic acid content of from about 0.03 ephr to about 0.05 ephr, a butadiene content of from about 60 percent to about 70 percent, and an acrylonitrile content of from about 30 percent to about 40 percent.

In some embodiments of the present disclosure, the formulation can further include a polymer besides the polyester. This other polymer that can be present in the formulation can include, for example, NR, ACM, EPDM, or PVC, as defined above. When another polymer besides a polyester is employed, the another polymer can be present in the formulation in an amount from about 1 weight percent to about 30 weight percent, with an amount from about 2 weight percent to about 5 weight percent being more typically.

In some embodiments of the present disclosure, the formulation, preferably the aqueous formulation, can include at least one additive. The at least one additive that can be employed in the present disclosure can include a wetting agent, a dispersing agent, a rheology modifier, a wax, a defoaming agent, a pH control agent, an adhesion promoter, a plasticizer, an antioxidant, an antiozonant, a tackifier, a flame retardant, a curative agent, a fungicide, and/or a blowing agent. In embodiments, a combination of these additive can be employed. When an additive is employed, the additive can be present in the formulation in an amount from about 1 weight percent to about 30 weight percent of the final formulation, with an amount from about 1 weight percent to about 15 weight percent of the final formulation being more typically.

A wetting agent (or surfactant) is a chemical compound that reduces the surface tension of a liquid allowing it to wet out and cover the substrate. Due to the relatively high surface tension of water, a wetting agent is necessary to reduce the interfacial tension between the fillers and water. This allows for the water to penetrate the filler clusters to aid in the dispersion process. Illustrative examples of wetting agents that can be employed in the present disclosure include, but are not limited to, alkylammonium salts, carboxylic salts, polyglycol polyester modified polyalkylene imines, ammonium salt of acrylate copolymer, and/or unsaturated polycarboxcylic polymers.

The following illustrates formulas from some of the wetting agents that can be used in the present disclosure:

Wetting Agents

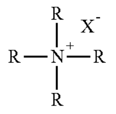

Alkyl Ammonium Salts
R=Short or long chain alkyl group, H
X=Cl-, F-, I-

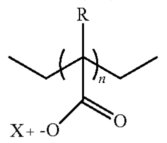

Carboxylic Salts
R=$CH_3$ H
X=Na+ K+

-continued

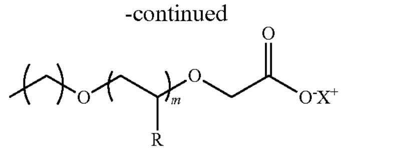

$1 \le n \le 15$ $1 \le m \le 15$

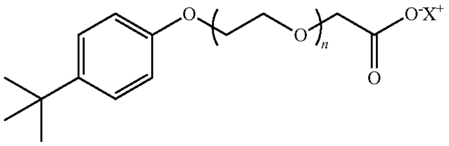

Glycolic Acid Ethoxylate 4-terbutylphenol ether
$1 \le n \le 15$

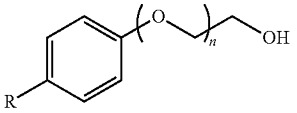

Triton 100X
$1 \le n \le 15$

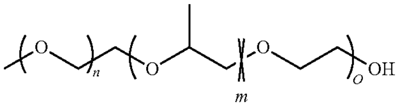

$1 \le n$ $1 \le 15$ $1 \le m$ $1 \le 15$ $1 \le O \le 15$
Poly(ethylene glycol)-block-(poly(propylene glycol)-block poly(ethylene glycol)

Dispersing agents are polymers or substances with active anchoring sites which covalently bond to the fillers surface. When added to the formulated coating preferably the homogeneous matrix, they improve the separation of particles and prevent settling or clumping via steric hindrance or repulsive effects. Illustrative examples of dispersing agents that can be employed in the present disclosure include, but are not limited to, alkyl ammonium salts, modified polyurethanes, modified styrene maleic acid copolymers, styrene maleic anhydride copolymers, and/or acrylic copolymers.

Rheology modifiers are additives that can adjust both the overall viscosity magnitude and control non-Newtonian behaviors such as shear thinning or shear thickening of the mixture, preferably a homogeneous mixture, of the present disclosure. The rheology modifiers can achieve desired viscosity, and can also help in controlling shelf stability, ease of disclosure, texture, and processability. Illustrative examples of rheology modifiers that can be employed in the present disclosure include, but are not limited to, modified ureas, urea modified polyurethanes, synthetic layered silicates, organo-modified clays, cellulose modified polymers, and/or minerals containing silicone.

The following provides formulas for some of the rheology modifiers that can be employed in the present disclosure:

Rheology Modifiers

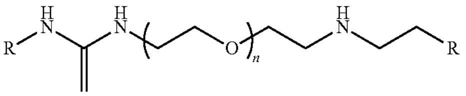

Modified Urea's
$1 \le n \le 20$

-continued

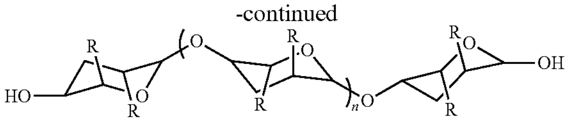

Cellulose
$300 \le n \le 1000$
R=H, $CH_3$, $CH_2CH(OH)CH_3CH_2CH_2OH$

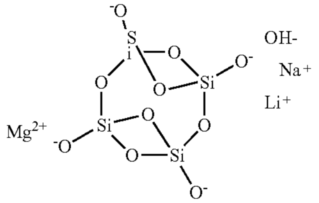

Silicates

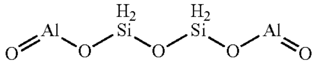

Kaolinite

The pH control additive that can be used in the present disclosure include buffers such as, for example, ammonium bicarbonate buffer, acetic acid buffer, borate buffer, citric acid buffer and/or sulfate buffer.

The tackifier agents that can be employed in the present disclosure include, but are not limited to, low molecular weight (i.e., molecular weight of 1000 or less) NBR, HNBR, and/or acrylics. The tackifier is used to improve compression recovery.

Waxes are organic materials with a high molecular weight (greater than 2000), similar to fats and oils; however, waxes are solid or liquid at room temperature. Waxes are employed in the formulation of the present disclosure to improve heat ageing characteristics of the conductive article of manufacture (e.g. rubber material gasket). Illustrative examples of waxes that can be employed in the present disclosure include, but are not limited to, paraffin waxes, polyethylene glycol waxes, and/or polypropylene waxes. Waxes can be employed in a solvent based, water based, or in a dry powder form.

Formulas for some of the waxes that can employed in the present disclosure are as follows:

Waxes

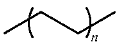

Paraffin Wax
$5 \le n \le 20$

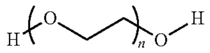

Polyethylene Glycol
$5 \le n \le 20$

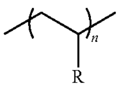

Polypropylene
$5 \le n \le 20$
R=$CH_3$

Defoaming agents (i.e., anti-foaming agents) are chemical additives that reduce and hinder the formation of a foam during the mixing process. The terms anti-foam agent and defoaming agent are often used interchangeably. Notably, defoaming agents eliminate existing foam in the formulation and prevent the formation of further foam in the formulation. Illustrative examples of defoaming agents that can be employed in the present disclosure include, but are not limited to, silicone, silicone free, silicone free powders, and/or silicone powder defoamers, (low to medium boiling point alcohols).

Formulas for some of the defoaming agents that can be employed in the present disclosure are as follows:

Defoamers

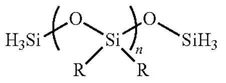

Silicone Based
1 ≤ n ≤ 20
R= H, $CH_3$, Phenol

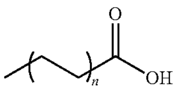

Fatty Acids
1 ≤ n ≤ 20

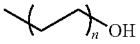

Fatty Alcohols
1 ≤ n ≤ 20

Adhesion promoters, or coupling agents, are chemicals that act at the interface between an organic polymer and an inorganic substrate to enhance adhesion between the two materials. Organic and inorganic materials are very different in many ways, for example, compatibility, chemical reactivity, surface energies, and coefficient of thermal expansion, such that forming a strong adhesion bond between these two dissimilar materials is difficult. An adhesion promoter, in its optimal sense, will act effectively at the organic-inorganic interface to wed these dissimilar materials chemically and physically into a strong cohesive bond structure. Illustrative examples of adhesion promoters that can be employed in the present disclosure include, but are not limited to, polyester alkyl ammonium salts, hydroxy-functional copolymer with acidic groups, amino functional polyethers, as well as functionalized silanes containing amine, epoxy, isocyanate, and or thiol groups.

The plasticizer includes a substance added to a resin to produce or promote plasticity and flexibility and to reduce brittleness. Illustrative examples of plasticizers that can be employed in the present disclosure include, but are not limited to, phthalates, dicarboxylates, phosphates and/or fatty acid esters.

The antioxidant is a compound that inhibit oxidations, a chemical reaction that can produce free radicals and chain reactions. Illustrative examples of antioxidant that can be employed in the present disclosure include, but are not limited to, phenols, amines, phosphites and/or thioesters.

Formulas for some of the antioxidants that can be employed in the present disclosure are as follows:

Antioxidants

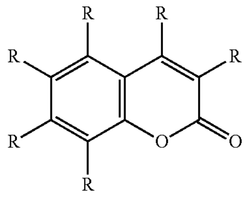

R=Cl or $CH_3$
Coumarins

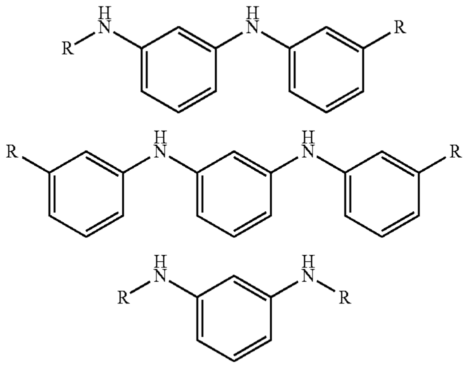

R=secondary alkyl groups $C_6$ or larger, $CH_3$, or H
N.N'-Dialkyl-p-phenylenediamines The antiozonant is an organic compound that prevents or retards damage caused by ozone. In the present disclosure, the antiozonants are those which prevent degradation of the conductive rubber composite coating. Illustrative examples of antiozonants that can be employed in the present disclosure include, but are not limited to, N'-substituted p-phenylenediamines (including dialkyl p-phenylenediamines, alkyl-aryl p-phenylenediamines, and diaryl p-phenylenediamines), 6-ethox-2,2,4-trimethyl-1,2 dihydroquinoline, and/or paraffin waxes.

Formulas for some of the antiozonants that can be employed in the present disclosure are as follows:

Antiozonants

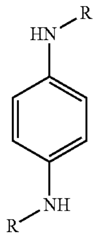

R=H, Phenyl, hexyl, or short and long chain alkyls
p-Phenylenediamne

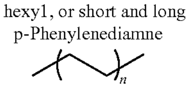

Paraffin Wax
5 ≤ n ≤ 20

-continued

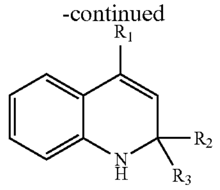

Dihydroquinoline
$R_1$, $R_2$, $R_3$=Short and long chain alkys, phenyl, hydrogen, and or methoxy groups The flame retardant is a substance that prevents ignition and/or retards burning of the conductive rubber composite coating of the present disclosure. Illustrative examples of flame retardants that can be employed in the present disclosure include, but are not limited to, decabromodiphyenyl ether, tetrabromobisphenol A, hexabromocyclododecane, tris(1,3-dichloro-2-propyl)phosphate, and (bis(2-chloropropyl)phosphate.

Formulas for some of the flame retardants that can be employed in the present disclosure are as follows:

Flame Retarders

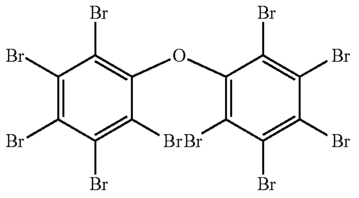

Decabromodiphenyl ether

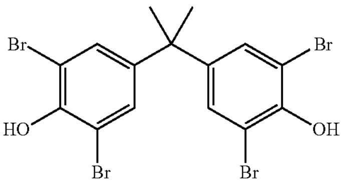

Tetrabromobisphenol A

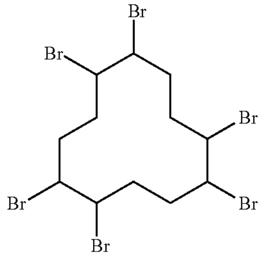

Hexabromocyclododecane

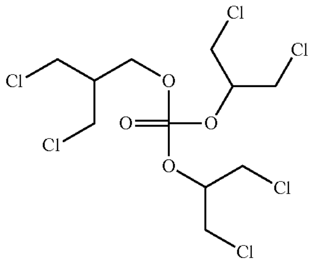

Tris(1,3-dichloro-2-propyl)phosphate

-continued

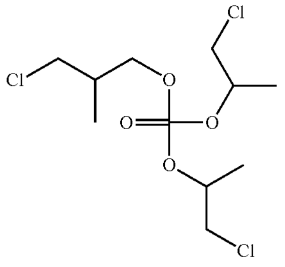

(bis(2-chloropropyl)phosphate

The curative agent (sometimes referred to as a curing agent or a crosslinker) is a substance that participates in the chemical reaction between the oligomer, pre-polymer and polymer, to achieve the polymerization process and provide the final film. Illustrative examples of curative agents that can be employed in the present disclosure include, but are not limited to, amine-type curing agents, amide type curing agents, silane type curing agents, isocyanate type curing agents, arizidine and/or mercapto compounds.

Formulas for some of the curative agents that can be employed in the present disclosure are as follows:

Curing Agents

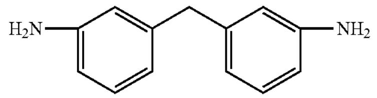

Diamino diphenyl methane

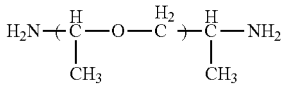

Polyetheramine
$5 \leq n \leq 30$

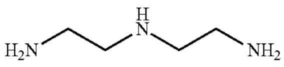

Diethylenetriamine

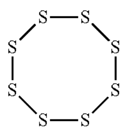

Sulfur

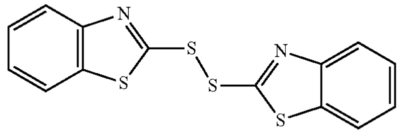

Benzothiazyl Disulfide

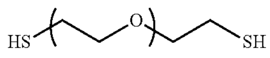

Hexa(ethylene glycol)dithiol

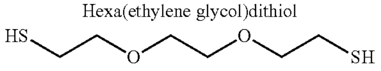

2,2′-(Ethylenedioxy)diethanethiol

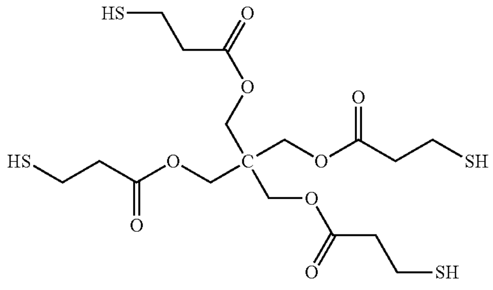

Trimethylolpropane tris(3-mercaptopropionate)

-continued

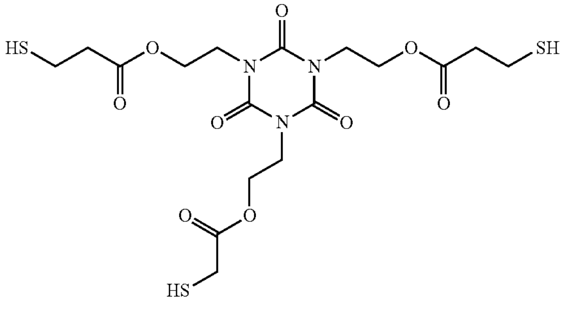

Tris[2-(3-mercaptopropionyloxy)ethyl] isocyanurate

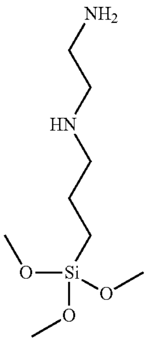

3-(2-aminoethyl)-aminopropyl] trimethoxysilane

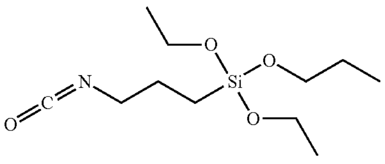

3-Isocyanatopropyltriethoxysilane

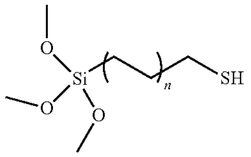

Thiol functional methoxy silane
$1 \leq n \leq 10$

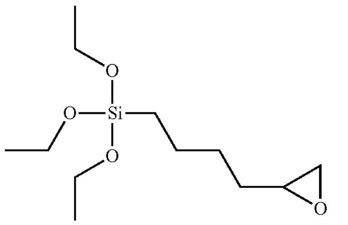

Glycidoxypropyltrimethoxysilane

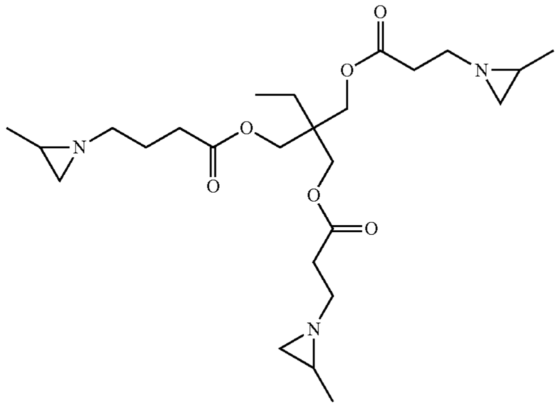

Trimethylolpropane tris(2-methyl-1-aziridenepropionate

-continued

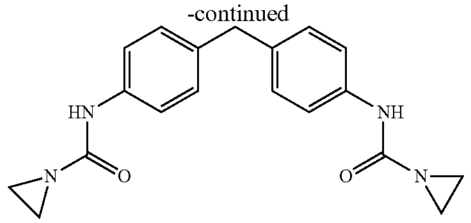

N,N′-(Methylenedi-p-phenylene)bis(azirdine-1-carboxamide))

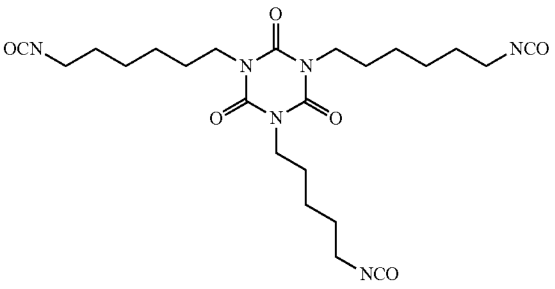

HDI Isocyanurate

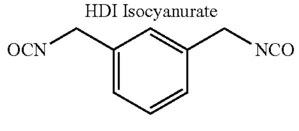

4,4′-methylenebis(phenyl isocyanate)

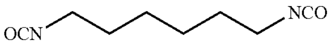

Hexamethylene diisocyanate

The fungicide is a substance that destroy fungus. Illustrative examples of fungicides that can be employed in the present disclosure include, but are not limited to, carbendazim and chlorothalonil; their formulas are as follows:

Fungacide

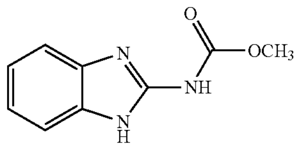

Carbendazim

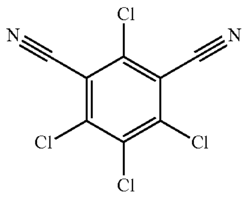

Chlorothalonil

The blowing agent is a substance which is capable of producing a cellular structure via a foaming process in a variety of materials that undergo hardening or phase transition, such as polymers, plastics, and metals. The blowing agents are typically applied when the blown material is in a liquid stage. Illustrative examples of blowing agents that can be employed in the present disclosure include, but are not limited to, ammonium bicarbonate, sodium bicarbonate and/or sodium borohydrate, etc.

Formulas for some blowing agents that can be employed in the present disclosure are as follows:

Chemical Blowing Agents

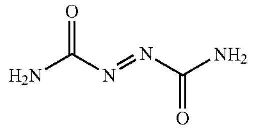

Azocarbomide

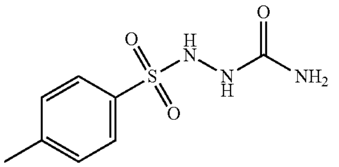

p-toluenesulfonyl hydrazide

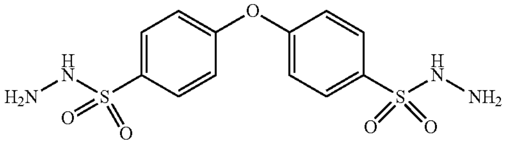

4,4′ Oxybis(benzenesulfonyl-hydrazide)

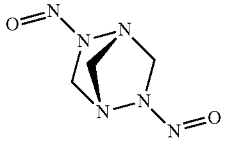

Dinitrosopentamethylene tramine

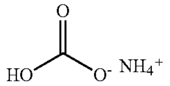

Ammonium bicardonate

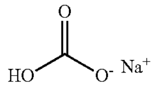

Sodium bicarbonate

In some embodiments of the present disclosure, the mixture, preferably the homogeneous mixture that provides the formulation of the present disclosure is an aqueous mixture. In such an embodiment, the mixture, preferably the homogenous mixture, includes water as a solvent. When employed, water can be present in the formulation in an amount from about 30 percent to about 100 percent, with an amount from about 40 percent to about 60 percent being more typical.

In some embodiments of the present disclosure, the mixture, preferably the homogenous mixture, which provides the formulation of the present disclosure is a non-aqueous mixture. The non-aqueous mixture is designed specifically to allow conductive particles to be evenly distributed upon final coating. This helps to keep the conductivity of the final film maximized after drying and vulcanization. In such an embodiment, the mixture, preferably the homogenous mixture, includes a solvent (e.g., polar or non-polar) other than water. Illustrative examples of polar solvents that can be employed include, but are not limited to, ethylene glycol, propylene glycol, butylene isopropyl alcohol, acetone, methyl ethyl ketone, and or methyl isobutyl ketone, cyclohexanone, and n-butyl acetate. Illustrative examples of non-polar solvents that can be employed include, but are not limited to, toluene, xylene (i.e., para, meta, and/or ortho), cyclohexane, and methyl cyclohexane. In addition it is possible to use bio solvents and biodiesels. When employed, the solvent other than water can be present in the formulation in an amount from about 0 percent to about 100 percent with an amount from about 40 percent to about 60 percent being more typical.

The solvent-based formulation of the present disclosure can be prepared first by creating a masterbatch which encompasses the NBR, polyester, at least one conductive filler, and optional ingredients (i.e. HNBR, other polymer besides polyester, and at least one additive). The masterbatch is first ground into a fine particles with an average size being between 5-10 mm. The ground up masterbatch is fed to a mixture where a solvent (i.e. polar, non-polar or a mixture thereof) is added. The aforementioned ingredients can be referred to as components/raw materials. Once the raw material is added to the mixing apparatus, a high shear blade is utilized to help dissolve the masterbatch in the appropriate solvent. The components/raw materials are mixed until the masterbatch is fully dissolved. Mixing time is typically 1 hour to 24 hours with a mixing time of 2 hours to 8 hours being more typical.

The water-based formulation of the present disclosure can be prepared first by mixing water and a polar solvent (i.e. acetone, ethylene glycol, propylene glycol, butylene isopropyl alcohol etc.) with a rheology modifier including, but not limited to, modified ureas, urea modified polyurethanes, synthetic layered silicates, and or organo-modified clays. Once the rheology modifier is dispersed in the appropriate solvent, other additives such as wetting agents, dispersing agents, waxes, and defoaming agents are added to the mixture at this point where a homogenous mixture is obtained using a high shear mixing blade. To the homogenous mixture, NBR can be added under high shear to obtain the final liquid coating. Once a homogenous mixture is obtained, the mixture can be further grounded by incorporating stainless steel balls with an average diameter of 6 mm to 75 mm, but more typically 25 mm to 50 mm and placed on a roll mill for ball milling with a time range of 1 hour to 36 hours, but more typically 5 hours to 24 hours.

After adding the various components/raw materials together, the combined components/raw materials are mixed until a mixture, preferably a homogeneous mixture, is obtained. In one example, mixing includes high shear mixing of the components/raw materials. In such an embodiment, the shear rate is typically 500 rpm or greater, with a shear rate from 1000 rpm to 3000 rpm being more typical. In embodiments, the mixing apparatus can be cooled utilizing water or other cooling means.

The mixing provides a mixture, preferably a homogenous mixture, which has a viscosity of from about 500 centipoise (Cp) to about 30,000 Cp, with a viscosity from about 2000 Cp to about 20,000 Cp being more typical. The viscosity can be measured by a Brookfield viscometer. Once vulcanized to a substrate both solvent and water-reducible conductive rubber composite will have the following characteristics; excellent adhesion to the bonded substrate, excellent fluid and heat resistance (i.e., oils, coolants, greases, prolonged exposure to elevated temperatures, and corrosive environments) as specified in ASTM D2000, and ASTM F146. The conductive rubber composite should retain its conductivity after exposure to the environments listed above. After exposure, the conductivity of the rubber composite to be $10E^{-4}$ S/cm or greater.

The formulation described above can then be coated onto a substrate. In the present disclosure, coating can include, for example dip coating, brush coating, blade coating, spray coating, and/or roll/coil coating. The formulation can be coated on at least one of the surfaces of the substrate. In one or more embodiments, the formulation is coated on both sides of a substrate, and in a further embodiment, the formulation is coated on all exposed surfaces of the substrate.

The substrate that can be employed in the present disclosure includes, but is not limited to, a metal substrate, a textile substrate, plastic, or any other material which would benefit from having a conductive rubber composite coated thereon. Examples of metal substrates that can be employed in the present disclosure include, but are not limited to, metal gaskets with substrates of cold rolled, stainless, galvanized, or aluminum. Examples of textile substrates that can be employed in the present disclosure include, but are not limited to, fiber glass, textile, Nylon, and polyester. Examples of a plastic substrate that can be employed in the present disclosure include, but are not limited to, polyethylene, polypropylene, or PTFE. When the substrate is a metal gasket, the conductive rubber coated metal gasket can be used in EV applications and the subsequent conductive rubber composite (i.e., coating and metal substrate) provided by vulcanization of the applied formulation provides both sealing and electromagnetic interference shielding. In such an embodiment, the metal gasket can have a thickness from about 0.1 mm to about 2 mm, and the coating can have a thickness from about 0.025 mm to about 0.35 mm.

After coating the formulation onto the substrate, a vulcanization process is performed so as to convert the coated formulation into a conductive rubber composite coating (i.e., coating and metal substrate). Vulcanization can be performed at a temperature from about 150° C. to about 260° C., with a vulcanization temperature from about 170° C. to about 230° C. being preferred. The vulcanization time may vary depending on the conditions used during the vulcanization process. In one embodiment, the vulcanization time is from about 5 minutes to about 30 minutes. The vulcanization package can include, but is not limited to, sulfur, sulfonamides, guanidine, thiazoles, zinc oxide, peroxide, carbamates, etc. and/or any combination thereof. Vulcanization can include, but is not limited to, forced air convection oven, infrared radiation, electron beam radiation, ultraviolet radiation, and LED radiation.

The resultant conductive rubber composite coating provided by vulcanization of the formulation of the present disclosure is an elastomeric polymer blend of nitrile butadiene rubber and polyester and or any other combination previously stated. The elastomeric polymer blend has at least one conductive filler contained in the matrix of the elastomeric polymer blend. In one or more embodiments, the at least one conductive filler is uniformly distributed throughout the entire matrix of the elastomeric polymer blend. The elastomeric polymer blend can include any of the optional components/raw materials (i.e., HNBR, other polymer besides a polyester, at least one additive) mentioned above. The elastomeric polymer blend can also be aqueous or non-aqueous. The amounts of the various components/raw materials present in the elastomeric polymer blend of the present disclosure are the same as those described above for the formulation of the present disclosure.

The elastomeric polymer blend has a conductivity of about $10E^{-4}$ S/cm or greater and/or an electromagnetic interference shielding of about 20 dB or greater. More typically, the elastomeric polymer blend has a conductivity of about $10E^{-3}$ S/cm to about $5E^{-1}$ S/cm and/or an electromagnetic interference shielding of about 30 dB to about 100 dB. In a preferred embodiment, the elastomeric polymer blend has a conductivity of about $10E^{-2}$ S/cm or greater and an electromagnetic interference shielding of about 50 dB or greater, typically, a conductivity of about $5E^{-2}$ S/cm or greater and an electromagnetic interference shielding of about 75 dB or greater. The conductivity of the elastomeric polymer blend can be determined by ASTM D257. The electromagnetic interference shielding of the elastomeric polymer blend can be determined by ASTM D4935.

The elastomeric polymer blend that provides the conductive rubber composite coating includes the NBR, polyester, at least one conductive filler and the optional components/raw materials (i.e., HNBR, other polymer besides a polyester, at least one additive) in amounts as mentioned above. Prior to the vulcanization process, the solvent and/or water needs to be removed. A separate drying step can be performed prior to vulcanization to remove the solvent and/or water from the conductive rubber composite prior to vulcanization. In such an embodiment, the separate drying step is performed at a temperature that is sufficient to evaporate the solvent and/or water, yet below the vulcanization temperature. In one example, the separate drying step is performed at a temperature from about 50° C. to about 180° C., with a typical drying temperature from about 100° C. to about 130° C. The drying time may vary depending on the conditions used during the drying process. In one embodiment, the drying time is from about 5 minutes to about 30 minutes.

The elastomeric polymer blend of the present disclosure typically has a thickness from 0.025 mm to 0.76 mm, with thickness from 0.05 mm to 0.7 mm being more typical. The elastomeric polymer blend that provides the conductive rubber composite coating can have a Young's modulus from about 1.0 Mega Pascal (MPa) to about 5.0 MPa, with a Young's modulus from about 1.0 MPa to about 3.5 MPa being more typical. Young's modulus is a measure of a solid's (i.e., the elastomeric polymer blend of the present disclosure) stiffness or resistance to elastic deformation under load. In the present disclosure, Young's modulus can be measured by tensile experiments which measure the rate of strain as a function of stress. The elastomeric polymer blend that provides the conductive rubber composite coating can have a tensile stress from about 2 MPa to about 25 MPa, with a tensile stress from about 10 MPa to about 20 MPa being even more typical. The elastomeric polymer blend exhibits elongation values of 200% to 400% with values of 250% to 350% being more typical. The elastomeric polymer blend exhibits compression set values of 2% to 30% with compression set values of 15% to 20% being more typical. The elastomeric polymer blend provides excellent oil resistance and can be determined by volume swell. The elastomeric polymer blend of the present disclosure exhibits volume swell of 0% to 30% with 0% to 5% being more typical.

The conductive elastomeric composite exhibits a compressibility between 0-5% and a recovery of 50-90%. After immersion in various fluids (i.e., oils, transmission fluids, and coolants) under extreme conditions (i.e., temperature, pressure, and or fluids); the conductive elastomeric composite exhibits superior adhesion to the substrates. Adhesion values greater than 1.5 Mpa were measured and determined by ASTM D4541. The elastomeric composite also exhibits excellent flexibility after exposure to extreme conditions (i.e., temperature, pressure, and/or fluids). No delamination from the substrate is observed even after being bent over a 6 mm mandrel.

Reference is now made to FIG. 1 which is a cross sectional illustration of an article of manufacturing including the conductive rubber composite in accordance with the present disclosure as a coating 12A, 12B located on a topmost surface 11A and a bottommost surface 11B of a substrate 10. Notably, coating 12A, 12B is an elastomeric polymer blend of the present disclosure including a nitrile butadiene rubber and a polyester having at least one conductive filler contained in the elastomeric polymer blend. The elastomers polymer blend can include any of optional components/raw materials mentioned above. The coating 12A, 12B composed of the conductive rubber composite of the present disclosure has a conductivity and an electromagnetic interference shielding within the ranges mentioned above. The substrate 10, which can be formed of metals, textiles, and/or plastics as mentioned previously in this disclosure, can in one or more embodiments have a thickness t1 of about 0.076 mm to about 2.54 mm, more preferably about 0.15 mm to about 1.27 mm. Other thicknesses, t1, for the substrate 10 are contemplated. The bottom coating 12A in one or more embodiments has a thickness t2 of about 0.025 mm to about 0.22 mm, more preferably about 0.025 mm to about 0.15 mm. The top coating 12B in one or more embodiments has a thickness t3 of about 0.025 mm to about 0.22 mm, more preferably about 0.025 mm to about 0.15 mm. Other thicknesses t2, t3 for the coatings 12A, 12B are contemplated. The thickness t2 of the bottom coating 12A and the thickness t3 of the top coating 12B can be the same or different.

Figure 2:
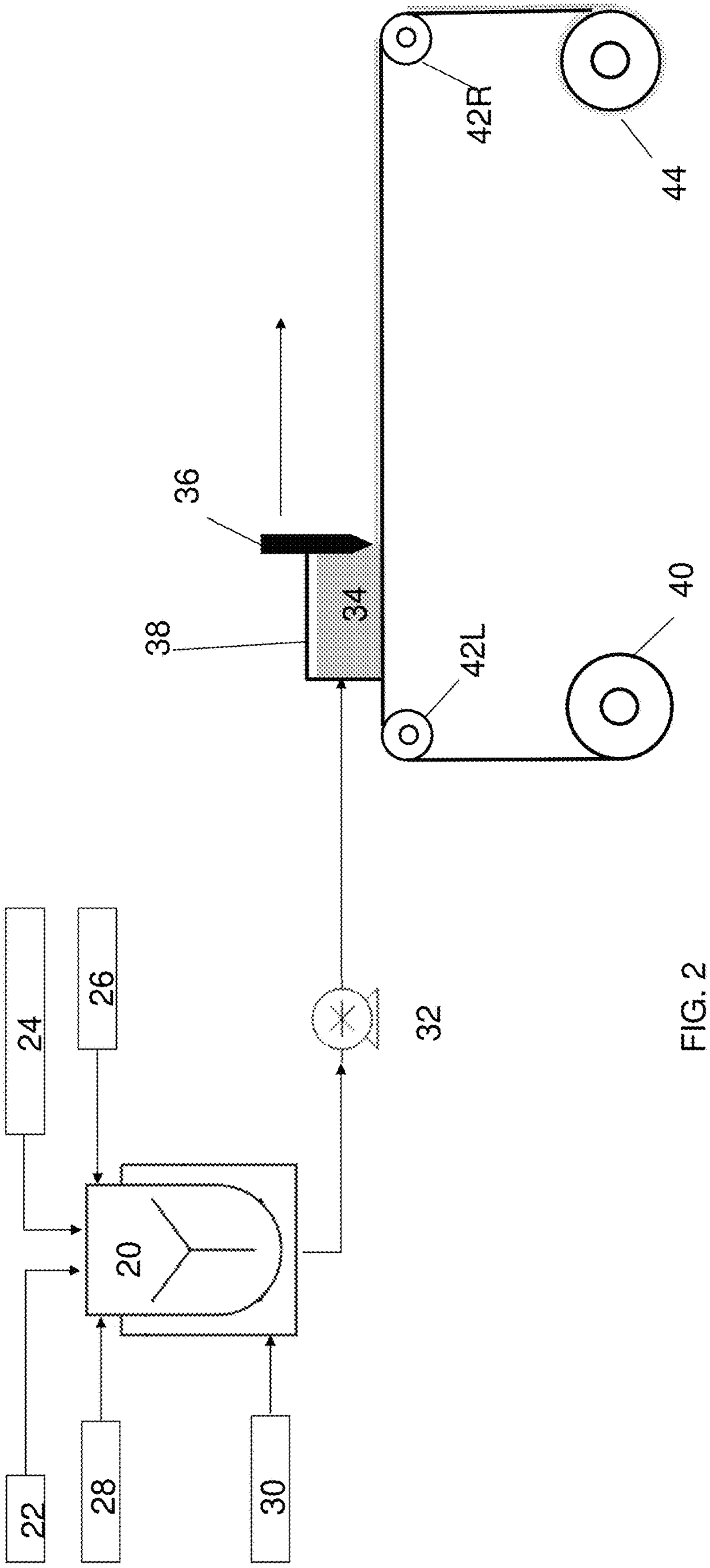
FIG. 2 is a schematic illustrating a coating process that can be employed in the present disclosure.

Reference is now made to FIG. 2, which is a schematic illustrating a coating process (i.e., a roll coating process) that can be employed in the present disclosure. Notably, FIG. 2 illustrates a mixing apparatus 20 that can be contained within a cooling device 30. In one example, mixing device 20 is a high shear mixer and cooling device is a container containing water. In the process flow illustrated in FIG. 2, there is shown a conductive filler feed 22, a polymer filler feed 28, a solvent feed 24 and an optional additive feed 26. The polymer feed can be used to add NBR, polyester and optionally the HNBR. The sequence of adding each individual component/raw material into the mixing apparatus can vary as discussed above. Within the mixing apparatus 20 the components/raw materials are mixed until the formulation of the present disclosure is obtained. That is, the components/raw materials are mixed sufficiently to provide a mixture, preferably a homogeneous mixture, containing the added raw materials. Once the formulation is made, the formulation is transferred from the mixing apparatus 20 to coating box 38. A pump 32 can aid in this transferring process. In the drawing, the formulation within the coating box 38 is labeled as element 34.

The coating box 38 is a component of a roll coating machine that further includes coating blade 36, coil 40, coated coil 44 and rollers 42L, 42R. In the roll coating process the coating is applied to a substrate (not specifically shown) in the direction of the arrow shown in FIG. 2. The blade 36 is employed to ensure an even distribution of the formulation onto the surface of the substrate. After coating, the coated formulation is at least dried and cured, as described above, to provide a coating of an elastomeric polymer, as described above, on a substrate.

Examples have been set forth below for the purpose of further illustrating the present disclosure. The scope of the present disclosure is not to be in any way limited by the examples set forth herein.

Examples

The following non-aqueous formulation (of the present disclosure) uses a conductive rubber containing conductive carbon black, graphene, defoaming agents, dispersing agents, antioxidants, antiozonants, wax's, and plasticizer's for the system. dissolved in an 80% Toluene 20% MIBK mixture. A weight percentage of 25 was obtained with rubber making up 78% of the solids. The formulation was blade coated at a wet film coating thickness 16 thousandths of an inch resulting in a wet film thickness of 5 thousandths on each side. A non-aqueous control (not of the invention) was used to compare these results to another sheet with a typical non-conductive NBR formulation of the same thickness on the same substrate.

The following aqueous formulation (of the present application) use Chemigum 550 as the polymer containing aqueous component, containing 41.7% rubber produced by Synthomer. The aqueous formulation was made by mixing this with several components in a particular order over the course of 2 hours such as conductive carbon black, graphene, defoaming agents, dispersing agents, antioxidants, antiozonants, wax's, and plasticizers, with ethylene glycol and water as the solvents for the system. Several cure systems were implemented before coating. A weight percentage of 38.5 was obtained from the sample with rubber making up 68% of the solids. The aqueous formulation was blade coated at a wet film of 7 thousands of an inch on each side of a stainless steel substrate resulting in a dry film thickness of 1 thousandth of an inch on each side of the stainless steel substrate. After drying at 170/190/250° F. for 2 minutes each the sheet is cured at 375° F. for 6 minutes. A thin film control is used to compare these results to another sheet with a typical non-conductive NBR formulation of the same thickness on the same substrate.

Tables 1A and 1B summarize the fluid immersion swelling tests (ASTM F146) that were obtained. Table 1A are the results using Toyota 50/50 Pre-Diluted Super Long Life Antifreeze/Coolant immersed for 100 hours at 125° C. weight and thickness measured both before and after immersion to find % change in measurements and using DEX III ATF oil immersed for 100 hours at 150° C. weight and thickness measured both before and after immersion to find % change in measurements. Table 1B are the results using IRM 903 oil immersed for 5 hours at 150° C. weight and thickness measured both before and after immersion to find % change in measurements, and using PAG oil immersed for 5 hours at 150° C. weight and thickness measured both before and after immersion to find % change in measurements.

TABLE 1A

Fluid immersion swelling test

| | Sample name | | | |
|---|---|---|---|---|
| | LLC (100 hr) | | DEX III (100 hr) | |
| | Weight change | Thickness change | Weight Change | Thickness change |
| aqueous formulation | 0.76% | 8.62% | 0.45% | 4.81% |
| Thin film control | 0.11% | 3.30% | 0.31% | 4.62% |
| Non-Aqueous formulation | 0.30% | 0.54% | 0.40% | 4.24% |
| Non Aqueous control | 0.71% | 0.29% | 0.14% | 0.44% |

TABLE 1B

Fluid immersion swelling test

| | Sample name | | | |
|---|---|---|---|---|
| | PAG (5 hr) | | IRM 903 (5 hr) | |
| | Weight change | Thickness change | Weight change | Thickness change |
| aqueous formulation | 0.32% | 1.26% | 0.42% | 1.78% |
| Thin film control | 0.04% | 0.16% | 0.12% | 0% |
| Non-Aqueous formulation | 0.05% | 0.51% | 0.17% | 1.00% |
| Non Aqueous control | 0.25% | 0.27% | 0.29% | 0.53% |

Table 2 summarizes the adhesion testing (ASTM D4541) that was taken at ambient, submerged in several fluids at different temperatures.

TABLE 2

Adhesion test results

| | Sample name | | | | |
|---|---|---|---|---|---|
| | Initial (Mpa) | Prestone 130° C. 336 hr (Mpa) | Heat Aged 150° C. 504 hr (Mpa) | DEX VI 150° C. 1008 hr (Mpa) | Dexos Oil 150° C. 168 hr (Mpa) |
| aqueous formulation | 3.24 | 2.9 | 1.88 | 2.52 | 2.82 |
| Thin film control | 4.04 | N/A | 2.14 | 2.66 | 4.31 |
| Non Aqueous formulation | 2.91 | 3.9 | 2.37 | 2.78 | 4.05 |
| Non Aqueous control | 9.08 | 5.76 | 3.81 | 4.88 | 6.05 |

Table 3 summarizes the resistivity testing under various conditions. Both Control samples showed zero resistivity when tested under all conditions.

TABLE 3

Resistivity test results

| | Sample name | | | | |
|---|---|---|---|---|---|
| | ambient resistivity (kΩ) | IRM oil immersion 5 hours 150° C. resistivity (kΩ) | PAG oil immersion 5 hours 150° C. resistivity (kΩ) | DEX III oil immersion 100 hours 150° C. resistivity (kΩ) | Toyota 50/50 coolant reflux immersion 100 hours resistivity (kΩ) |
| aqueous formulation | 5-10 kΩ | 14-18 kΩ | 8-12 kΩ | 10-12.5 kΩ | 15-18 kΩ |
| Thin film control | .5-3 kΩ | 1.2-3 kΩ | 1.2-3 kΩ | 2-6 kΩ | 2-3.5 kΩ |
| Non Aqueous formulation | 0 kΩ | 0 kΩ | 0 kΩ | 0 kΩ | 0 kΩ |
| Non Aqueous control | 0 kΩ | 0 kΩ | 0 kΩ | 0 kΩ | 0 kΩ |

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A formulation comprising:

a mixture of from about 20 weight percent to about 90 weight percent of nitrile butadiene rubber, from about 5 weight percent to about 50 weight percent of a polyester, and from about 5 weight percent to about 40 weight percent of at least one conductive filler, wherein the at least one conductive filler comprises a combination, based on weight percent of total conductive filler content in the formulation, of from about 5 weight percent to about 90 weight percent of carbon black, from about 10 weight percent to about 50 weight percent of graphene, from about 5 weight percent to about 20 weight percent of a carbon nanotube, and from about 5 weight percent to about 20 weight percent of a conductive metal nanoparticle.

2. The formulation of claim 1, wherein the mixture contains from about 50 weight percent to about 70 weight percent of the nitrile butadiene rubber, from about 10 weight percent to about 20 weight percent of the polyester, and from about 15 weight percent to about 30 weight percent of the at least one conductive filler.

3. The formulation of claim 1, wherein the mixture is a homogenous mixture.

4. The formulation of claim 1, wherein the mixture further comprises at least one of a hydrogenated nitrile butadiene rubber or a carboxylated nitrile butadiene rubber.

5. The formulation of claim 4, wherein the hydrogenated nitrile butadiene rubber is present in the formulation in an amount from 30 weight percent to 70 weight percent and contains up to 20 percent residual double bonds and has an acrylonitrile content of from about 16 percent to about 50 percent.

6. The formulation of claim 1, wherein the nitrile butadiene rubber has an acrylonitrile content of from about 15 percent to about 50 percent, and a butadiene content from about 50 weight percent to about 85 weight percent.

7. The formulation of claim 1, wherein the polyester comprises at least one ester chain having a formula of —[O—C(O)—R]n- wherein R is an aromatic group, a saturated aliphatic group or an unsaturated aliphatic group, and n is from 10 to 1000, and the polyester has a molecular weight from 1000 to 5000.

8. The formulation of claim 1, wherein the mixture further comprises from about 10 weight to about 30 weight percent of a polymer other than the polyester, at least one additive, or a combination of the other polymer other than the polyester and the at least one additive, wherein the at least one additive comprises a wetting agent, a dispersing agent, a rheology modifier, a wax, a defoaming agent, a pH control agent, an adhesion promoter, a plasticizer, an antioxidant, an antiozonant, a tackifier, a flame retardant, a curative agent, a fungicide, or a blowing agent.

9. The formulation of claim 1, wherein the mixture is aqueous.

10. The formulation of claim 1, wherein the mixture is non-aqueous.

11. A conductive rubber composite coating comprising:

an elastomeric polymer blend of a nitrile butadiene rubber and a polyester, wherein the elastomeric polymer blend has at least one conductive filler contained therein, and a conductivity of about 10E-4 Siemens/centimeter or greater, and wherein the at least one conductive filler comprises a combination, based on weight percent of total conductive filler content in the formulation, of from about 5 weight percent to about 90 weight percent of carbon black, from about 10 weight percent to about 50 weight percent of graphene, from about 5 weight percent to about 20 weight percent of a carbon nanotube, and from about 5 weight percent to about 20 weight percent of a conductive metal nanoparticle.

12. The conductive rubber composite coating of claim 11, wherein the elastomeric polymer blend has an electromagnetic interference shielding of about 40 decibels or greater.

13. The conductive rubber composite coating of claim 11, wherein the elastomeric polymer blend comprises from about from about 20 weight percent to about 90 weight percent of the nitrile butadiene rubber, from about 5 weight percent to about 50 weight percent of the polyester, and from about 5 weight percent to about 40 weight percent of the at least one conductive filler.

14. The conductive rubber composite coating of claim 11, wherein the elastomeric polymer blend further comprises at least one of a hydrogenated nitrile butadiene rubber or a carboxylated nitrile butadiene rubber.

15. The conductive rubber composite coating of claim 11, wherein the elastomeric polymer blend further comprises from about 10 weight to about 30 weight percent of a polymer other than the polyester, at least one additive, or a combination of the other polymer other than the polyester and the at least one additive, wherein the at least one additive comprises a wetting agent, a dispersing agent, a rheology modifier, a wax, a defoaming agent, a pH control agent, an adhesion promoter, a plasticizer, an antioxidant, an antiozonant, a tackifier, a flame retardant, a curative agent, a fungicide, or a blowing agent.

16. The conductive rubber composite coating of claim 11, wherein the elastomeric polymer blend is a foamed product.

17. The conductive rubber composite coating of claim 11, wherein the elastomeric polymer blend is a non-foamed product.

* * * * *